US011616711B1

(12) United States Patent
Cakulev et al.

(10) Patent No.: US 11,616,711 B1
(45) Date of Patent: Mar. 28, 2023

(54) SYSTEMS AND METHODS FOR ENABLING A NETWORK REPOSITORY FUNCTION TO RETURN A NON-EMPTY DISCOVERY RESPONSE

(71) Applicant: Verizon Patent and Licensing Inc., Basking Ridge, NJ (US)

(72) Inventors: Violeta Cakulev, Milburn, NJ (US); Lixia Yan, Basking Ridge, NJ (US); Timothy Potter, Monroe Township, NJ (US); Hossein M. Ahmadi, Parsippany, NJ (US); Ali Imdad Malik, East Brunswick, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/657,813

(22) Filed: Apr. 4, 2022

(51) Int. Cl.
*H04L 43/10* (2022.01)
*H04L 67/51* (2022.01)
*H04L 41/12* (2022.01)

(52) U.S. Cl.
CPC .............. *H04L 43/10* (2013.01); *H04L 41/12* (2013.01); *H04L 67/51* (2022.05)

(58) Field of Classification Search
CPC ..... H04L 41/12; H04L 67/303; H04L 41/082; H04L 43/10; H04L 43/106
See application file for complete search history.

(56) References Cited

U.S. PATENT DOCUMENTS

| 2011/0138161 | A1* | 6/2011 | Watkins | ............... G06F 13/102 713/2 |
| 2012/0167100 | A1* | 6/2012 | Li | .......................... G11C 16/22 710/5 |
| 2021/0306211 | A1* | 9/2021 | Landais | .............. H04L 41/0686 |
| 2022/0330054 | A1* | 10/2022 | Baliarsingh | ............. H04L 41/00 |
| 2022/0346188 | A1* | 10/2022 | Malhotra | .............. H04W 4/025 |

* cited by examiner

*Primary Examiner* — Backhean Tiv
*Assistant Examiner* — Linh T. Nguyen (57) ABSTRACT

A network device may provide heartbeat requests to a plurality of network function producers, and may set states of the plurality of network function producers to suspended based on not receiving responses to the heartbeat requests after a predetermined time. The network device may receive, from a network function consumer, a discovery request requesting identification of network function producers providing a service or with a network function type, and may determine, based on the discovery request, that none of the plurality of network function producers are available based on the states of the plurality of network function producers being set to suspended. The network device may provide, to the network function consumer, a discovery response that includes a list of the plurality of network function producers with status indicators set to active.

20 Claims, 9 Drawing Sheets

SYSTEMS AND METHODS FOR ENABLING A NETWORK REPOSITORY FUNCTION TO RETURN A NON-EMPTY DISCOVERY RESPONSE

BACKGROUND

A network repository function (NRF) is a network entity in a fifth-generation (5G) core network that maintains network function (NF) profiles of and services supported by available NFs and enables NFs to subscribe to, and receive notifications about, other NFs registered with the NRF. The NRF also supports a service discovery function by receiving NF discovery requests from NFs, and providing information about available NFs satisfying certain criteria (e.g., supporting a particular service).

DETAILED DESCRIPTION OF EXAMPLE EMBODIMENTS

The following detailed description of example implementations refers to the accompanying drawings. The same reference numbers in different drawings may identify the same or similar elements.

An NRF may provide an NF management service that enables an NF to register, update, or deregister its profile in the NRF. Once an NF registers with the NRF, the NRF maintains a health status of the registered NF using a heartbeat mechanism. If the NRF does not receive a heartbeat response message from a registered NF after a predetermined (e.g., configurable) quantity of time, the NRF determines that the registered NF is not available and sets a state of the NF to suspended. While the heartbeat response message may not be received by the NRF because an NF is not available, the heartbeat response message may also not be received by the NRF when an NF is available but is experiencing issues, such as transport issues. Nevertheless, an NF with a state set to suspended may not be discovered by other NFs.

An NRF may provide an NF discovery service that enables an NF consumer to discover a set of NF producers supporting an NF service or being a target NF type. In response to the NF discovery request, the NRF may provide a discovery response that includes a list of NF producers that support the NF service or are the target NF type. The NRF may also include, in the discovery response, a validity time that indicates, to the NF consumer, for how long the discovery response may be stored. In some scenarios, the NRF may provide a successful response, to a discovery request, that includes an empty set of NF producers. This may occur for several different reasons, such as if the NF producers are suspended due to transport issues. Receiving an empty set of NF producers results in denied service to a subscriber (e.g., a user equipment (UE)), even when an NF producer is available.

Thus, current mechanisms for addressing scenarios when the NRF erroneously returns an empty set of NF producers consume computing resources (e.g., processing resources, memory resources, communication resources, and/or the like), networking resources, and/or other resources associated with failing to provide a service to a UE that may be available from an NF, handling subscriber complaints due to the failure to receive the service, discovering that the service is available from the NF, providing the service to the UE via the NF after discovering that the service is available, and/or the like.

Some implementations described herein provide a network device (e.g., an NRF) that returns a non-empty discovery response. For example, the NRF may provide heartbeat requests to a plurality of NF producers, and may set states of the plurality of NF producers to suspended based on not receiving responses to the heartbeat requests after a predetermined time. The NRF may receive, from an NF consumer, a discovery request requesting identification of NF producers providing a service or with an NF type, and may determine, based on the discovery request, that none of the plurality of NF producers are available based on the states of the plurality of NF producers being set to suspended. The NRF may provide, to the NF consumer, a discovery response that includes a list of the plurality of NF producers with status indicators set to active.

In this way, the NRF may return a non-empty discovery response. For example, the NRF may be enhanced to enable the NRF to return a list of suspended NF producers in a discovery response to a discovery request from an NF consumer. In scenarios when the NRF cannot identify any NF producer with an active status, the NRF may return a list of NF producers that are in suspended state, but with a status set to active so that an NF consumer may select a suspended NF producer. Alternatively, the NRF may return a list of NF producers that are in a suspended state, but with lower priorities. This may ensure that the NF consumer selects other NF producers with higher priorities. Thus, the NRF may conserve computing resources, networking resources, and/or other resources that would otherwise have been consumed in failing to provide a service to a UE that is available from an NF, handling subscriber complaints due to the failure to receive the service, discovering that the service is available from the NF, providing the service to the UE via the NF after discovering that the service is available, and/or the like.

Figure 1A:
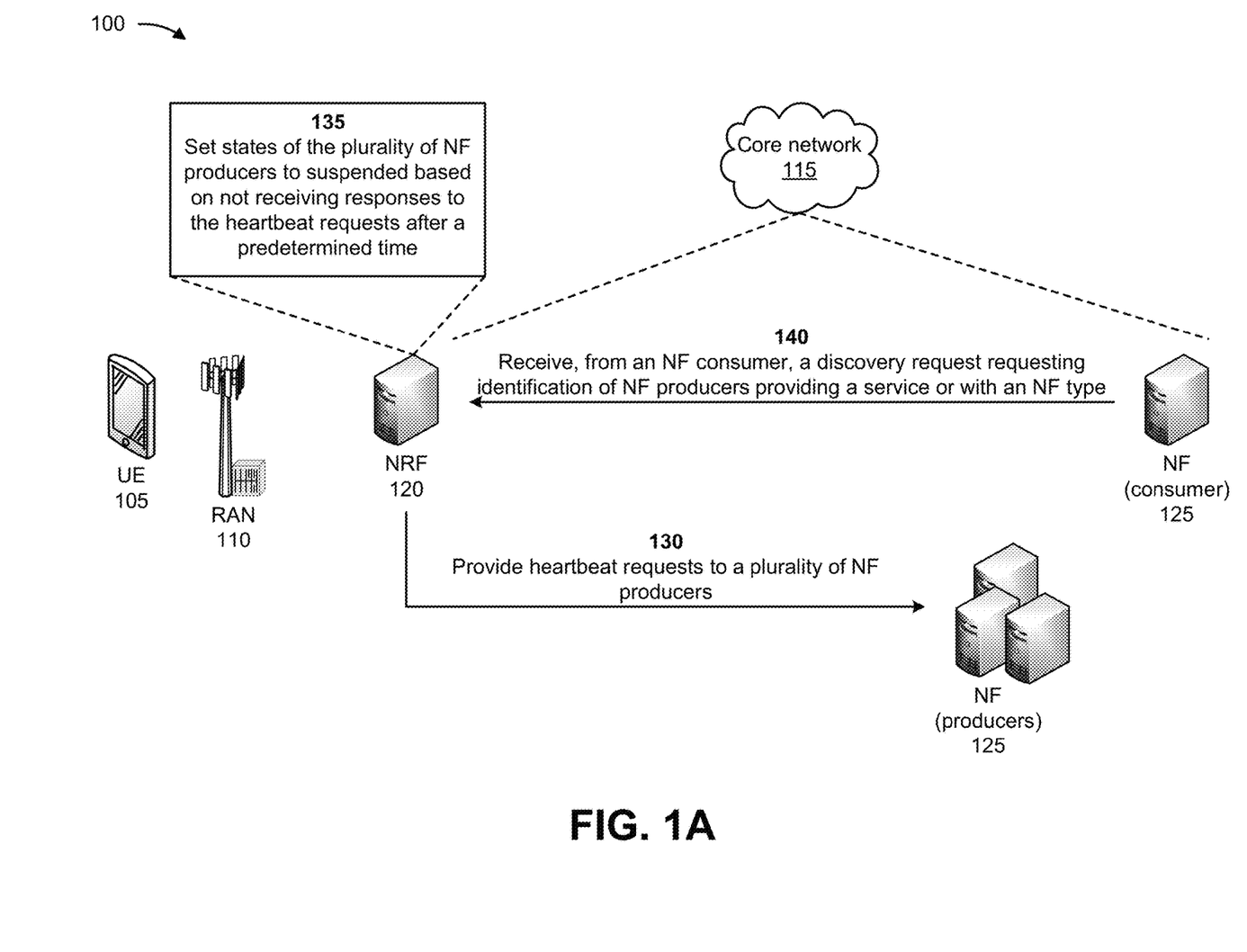
FIGS. 1A-1F are diagrams of an example associated with enabling an NRF to return a non-empty discovery response.

FIGS. 1A-1F are diagrams of an example 100 associated with enabling an NRF to return a non-empty discovery response. As shown in FIGS. 1A-1F, example 100 includes a UE 105, a RAN 110, and a core network 115. The core network 115 may include an NRF 120, an NF consumer 125, and/or a plurality of NF producers 125. Further details of the UE 105, the RAN 110, the core network 115, the NRF 120, and the NFs 125 are provided elsewhere herein. Although only a single UE 105 and RAN 110 are depicted in FIG. 1A, in some implementations multiple UEs 105 and RANs 110 may be associated with the core network 115.

As shown in FIG. 1A, and by reference number 130, the NRF 120 may provide heartbeat requests to the plurality of NF producers 125. For example, the NRF 120 may provide an NF management service that enables the plurality of NF producers 125 to register, update, or deregister NF profiles in the NRF 120. Once an NF producer 125 registers with the NRF 120, the NRF 120 may maintain a health status of the registered NF producer 125 using a heartbeat mechanism. The heartbeat mechanism may include the NRF 120 providing, to the plurality of NF producers 125, heartbeat requests that request responses within a predetermined time period. If a response to a heartbeat request is received from a particular NF producer 125 within the predetermined time period, the NRF 120 may determine that the particular NF producer 125 is available. Alternatively, if a response to a heartbeat request is not received from a particular NF producer 125 within the predetermined time period, the NRF 120 may determine that the particular NF producer 125 is unavailable.

As further shown in FIG. 1A, and by reference number 135, the NRF 120 may set states of the plurality of NF producers 125 to suspended based on not receiving responses to the heartbeat requests after a predetermined time. For example, if responses to the heartbeat requests are not received from the plurality of NF producers 125 within the predetermined time period, the NRF 120 may determine that the plurality of NF producers 125 are unavailable. While the responses to the heartbeat requests may not be received by the NRF 120 because the plurality of NF producers 125 are unavailable, the responses to the heartbeat requests may also not be received by the NRF 120 when the plurality of NF producers 125 are available but are experiencing issues, such as transport issues. When the NRF 120 determines that the plurality of NF producers 125 are unavailable, the NRF 120 may set the states of the plurality of NF producers 125 to suspended.

As further shown in FIG. 1A, and by reference number 140, the NRF 120 may receive, from the NF consumer 125, a discovery request requesting identification of NF producers 125 providing a service or with an NF type. For example, the NRF 120 may provide an NF producer 125 discovery service that enables the NF consumer 125 to discover a set of NF producers 125 supporting an NF service or being a target NF type. The NF consumer 125, via the discovery service, may generate the discovery request requesting identification of the NF producers 125 providing the service or with the NF type. For example, the discovery request may request identification of the NF producers 125 (e.g., application functions or AFs) that provide a particular application for the UE 105. In another example, the discovery request may request identification of NF producers 125 that provide an authentication service for the UE 105.

Figure 1B:
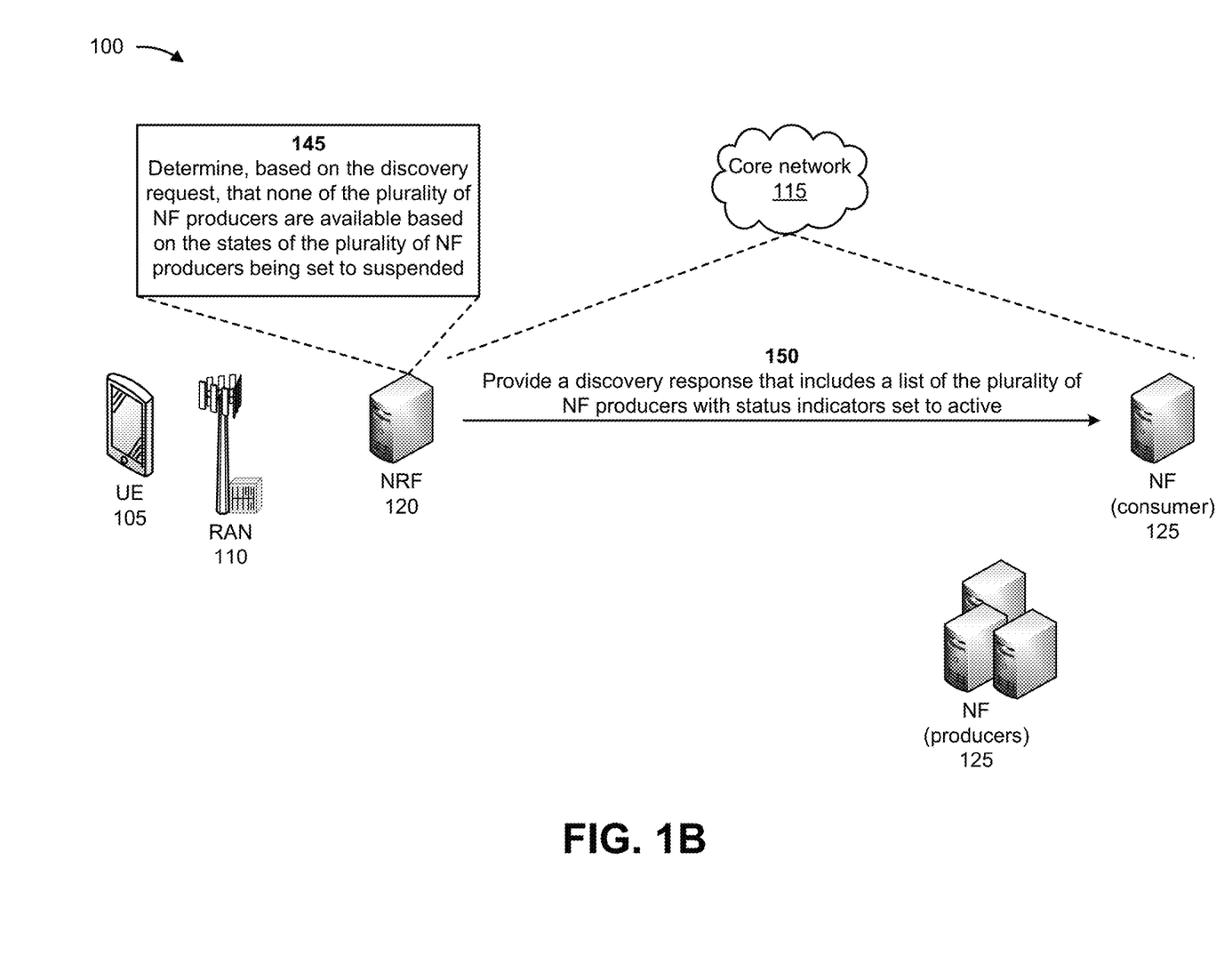

As shown in FIG. 1B, and by reference number 145, the NRF 120 may determine, based on the discovery request, that none of the plurality of NF producers 125 are available based on the states of the plurality of NF producers 125 being set to suspended. For example, based on the discovery request, the NRF 120 may determine whether any of the plurality of NF producers 125 are available and provide the service or are associated with the NF type. However, since the plurality of NF producers 125 are unavailable and the states of the plurality of NF producers 125 are all set to suspended, the NRF 120 may determine that none of the plurality of NF producers 125 are available to satisfy the discovery request. In such scenarios, the NRF 120 typically generates a discovery response, to the discovery request, that includes an empty set of NF producers 125. This may occur for several different reasons, such as if the NF producers 125 are suspended due to transport issues. Receiving an empty set of NF producers 125 results in denied service to the UE 105, even when an NF producer 125 is actually available. In some implementations, in such scenarios, the NRF 120 may generate a discovery response, to the discovery request, that does not include the empty set of NF producers 125.

As further shown in FIG. 1B, and by reference number 150, the NRF 120 may provide a discovery response that includes a list of the plurality of NF producers 125 with status indicators set to active. For example, the NRF 120 may generate a discovery response that includes the list of the plurality of NF producers 125 with the status indicators set to active, even though the plurality of NF producers 125 are reported as suspended. The NRF 120 may also include, in the discovery response, a validity time that indicates, to the NF consumer 125, for how long the discovery response may be stored. The NRF 120 may provide the discovery response, with the list of the plurality of NF producers 125 with the status indicators set to active, to the NF consumer 125. Since the status indicators are set to active, the NF consumer 125 may identify at least one of the plurality of NF producers 125 to provide a service to the UE 105.

Figure 1C:
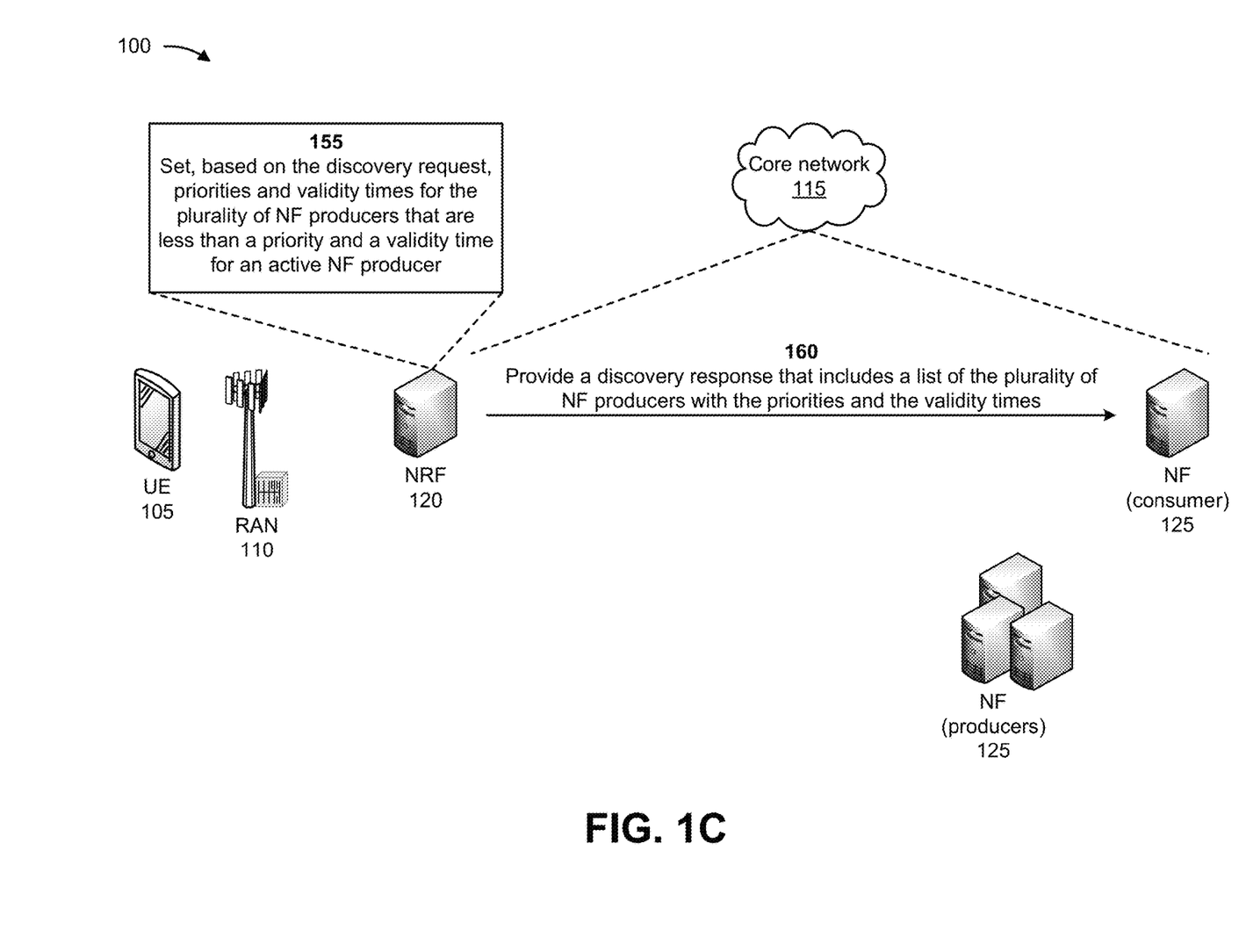

Alternatively, as shown in FIG. 1C, and by reference number 155, the NRF 120 may set, based on the discovery request, priorities and validity times for the plurality of NF producers 125 that are less than a priority and a validity time for an active NF producer 125. For example, based on the discovery request, the NRF 120 may set priorities for suspended NF producers 125 (e.g., the plurality of NF producers 125) that are lower than the priority for the active NF producer 125. This may ensure that the NF consumer 125 will select other NF producers 125 with higher priorities than the suspended NF producers 125. In addition, the NRF 120 may set a validity time or times for the suspended NF producers 125 that is less than the validity time for the active NF producer 125 to ensure that the NF consumer 125 rediscovers the suspended NF producers 125 after a shorter period of time. In some implementations, the NRF 120 may generate a discovery response, to the discovery request, that includes a list of the plurality of NF producers 125 with the priorities and the validity times.

As further shown in FIG. 1C, and by reference number 160, the NRF 120 may provide a discovery response that includes a list of the plurality of NF producers 125 with the priorities and the validity times. For example, the NRF 120 may generate the discovery response, to the discovery request, that includes the list of the plurality of NF producers 125 with the priorities and the validity times. In some implementations, the NRF 120 may select one or more of the plurality of NF producers 125 to include in the list based on the priorities set for the plurality of NF producers 125. The NRF 120 may provide the discovery response, with the list of the plurality of NF producers 125 with the priorities and the validity times, to the NF consumer 125. The NF consumer 125 may identify, based on the priorities, at least one of the plurality of NF producers 125 to provide a service to the UE 105.

Figure 1D:
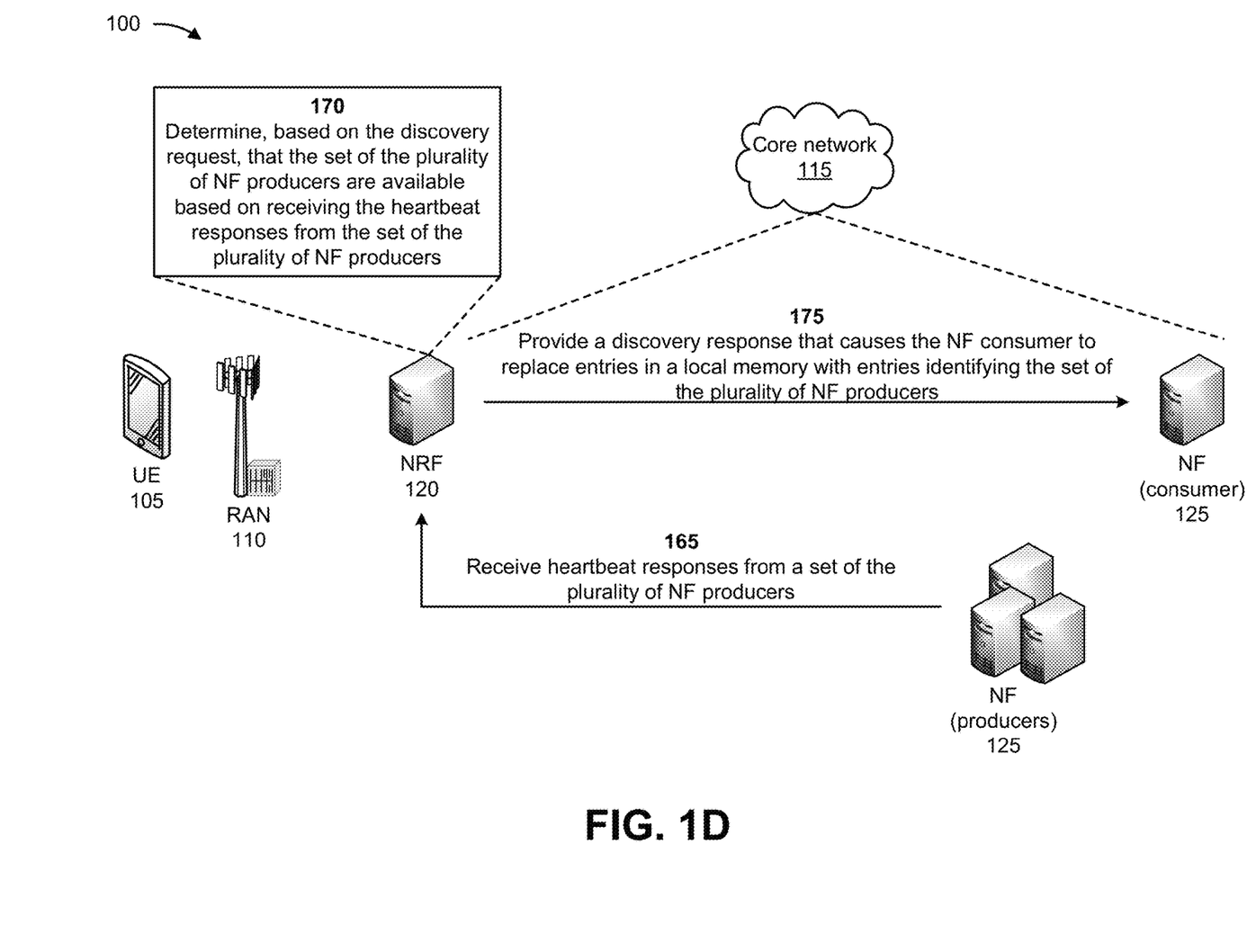

Alternatively, as shown in FIG. 1D, and by reference number 165, the NRF 120 may receive heartbeat responses from a set of the plurality of NF producers 125. For example, rather than as described above in connection with FIG. 1A, the set of the plurality of NF producers 125 may receive the heartbeat requests from the NRF 120, and may generate heartbeat responses to the heartbeat requests. The set of the plurality of NF producers 125 may provide the heartbeat responses to the NRF 120, and the NRF 120 may receive the heartbeat responses to the heartbeat requests within the predetermined time period.

As further shown in FIG. 1D, and by reference number 170, the NRF 120 may determine, based on the discovery request, that the set of the plurality of NF producers are available based on receiving the heartbeat responses from the set of the plurality of NF producers. For example, based on the discovery request, the NRF 120 may determine whether any of the plurality of NF producers 125 are available and provide the service or are associated with the NF type. In some implementations, when the heartbeat responses to the heartbeat requests are received from the set of the plurality of NF producers 125 within the predetermined time period, the NRF 120 may determine that the set of the plurality of NF producers 125 are available. The NRF 120 may determine that the remaining NF producers 125 (e.g., not included in the set of the plurality of NF producers 125) are unavailable based on not receiving heartbeat responses from the remaining NF producers 125.

As further shown in FIG. 1D, and by reference number 175, the NRF 120 may provide a discovery response that causes the NF consumer 125 to replace entries in a local memory with entries identifying the set of the plurality of NF producers 125. For example, the NRF 120 may generate, in response to the discovery request, a discovery response that includes the set of the plurality of NF producers 125. The NRF 120 may also include, in the discovery response, a validity time that indicates, to the NF consumer 125, for how long the discovery response may be stored. The NRF 120 may provide the discovery response, with the set of the plurality of NF producers 125, to the NF consumer 125. Since the NRF 120 returns a successful discovery response with a non-empty set of NF producers 125 and the validity time, the NF consumer 125 may replace existing entries stored in a local memory with entries identifying the set of the plurality of NF producers 125 and the validity time. The NF consumer 125 may identify at least one of the set of the plurality of NF producers 125 to provide a service to the UE 105. Once the validity time expires, the NF consumer 125 may provide a new discovery request to the NRF 120.

Figure 1E:
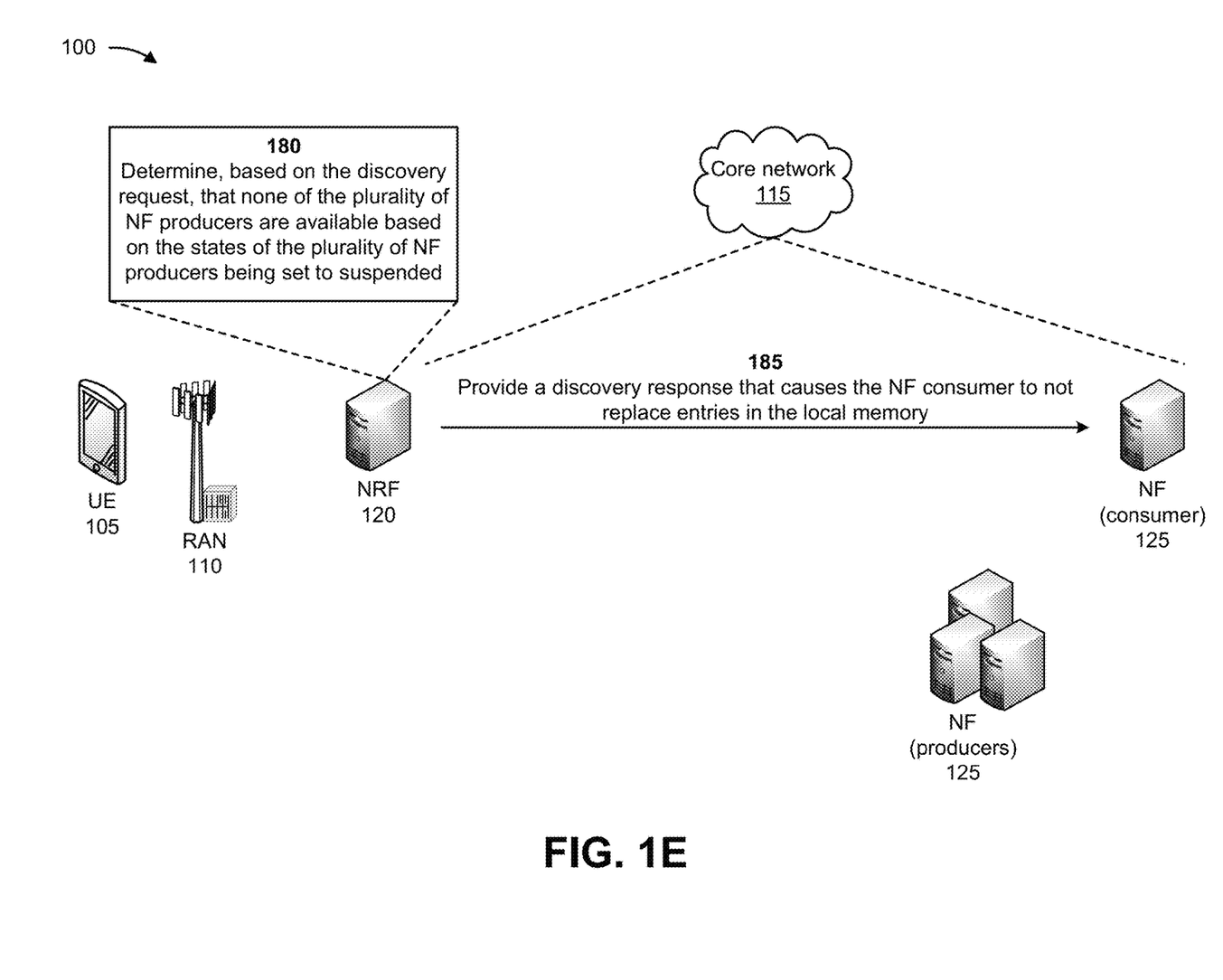

Alternatively, as shown in FIG. 1E, and by reference number 180, the NRF 120 may determine, based on the discovery request, that none of the plurality of NF producers 125 are available based on the states of the plurality of NF producers 125 being set to suspended. For example, based on the discovery request, the NRF 120 may determine whether any of the plurality of NF producers 125 are available and provide the service or are associated with the NF type. However, since the plurality of NF producers 125 are unavailable and the states of the plurality of NF producers 125 are set to suspended, the NRF 120 may determine that none of the plurality of NF producers 125 are available to satisfy the discovery request. In some implementations, in such scenarios, the NRF 120 may generate a discovery response, to the discovery request, that includes an empty set of NF producers 125.

As further shown in FIG. 1E, and by reference number 185, the NRF 120 may provide a discovery response that causes the NF consumer 125 to not replace entries in the local memory. For example, the NRF 120 may generate a discovery response, to the discovery request, that includes an empty set of NF producers 125. The NRF 120 may also include, in the discovery response, a validity time that indicates, to the NF consumer 125, for how long the discovery response may be stored. The NRF 120 may provide the discovery response, with the empty set of NF producers 125, to the NF consumer 125. Since the NRF 120 returns a successful discovery response with an empty set of NF producers 125 and the validity time, the NF consumer 125 may not replace existing entries stored in the local memory with entries identifying the plurality of NF producers 125 and the validity time. The NF consumer 125 may continue to utilize the existing entries stored in the local memory to identify at least one NF producer 125 to provide a service to the UE 105. In some implementations, the discovery response may include an information element (e.g., a replacement information element) that indicates whether the NF consumer 125 is to replace existing entries stored in the local memory. For example, if the discovery response includes an empty set of NF producers 125 and the replacement information element is set to "Yes," the NF consumer 125 may replace existing entries stored in the local memory. If the discovery response includes an empty set of NF producers 125 and the replacement information element is set to "No," the NF consumer 125 may not replace existing entries stored in the local memory.

Figure 1F:
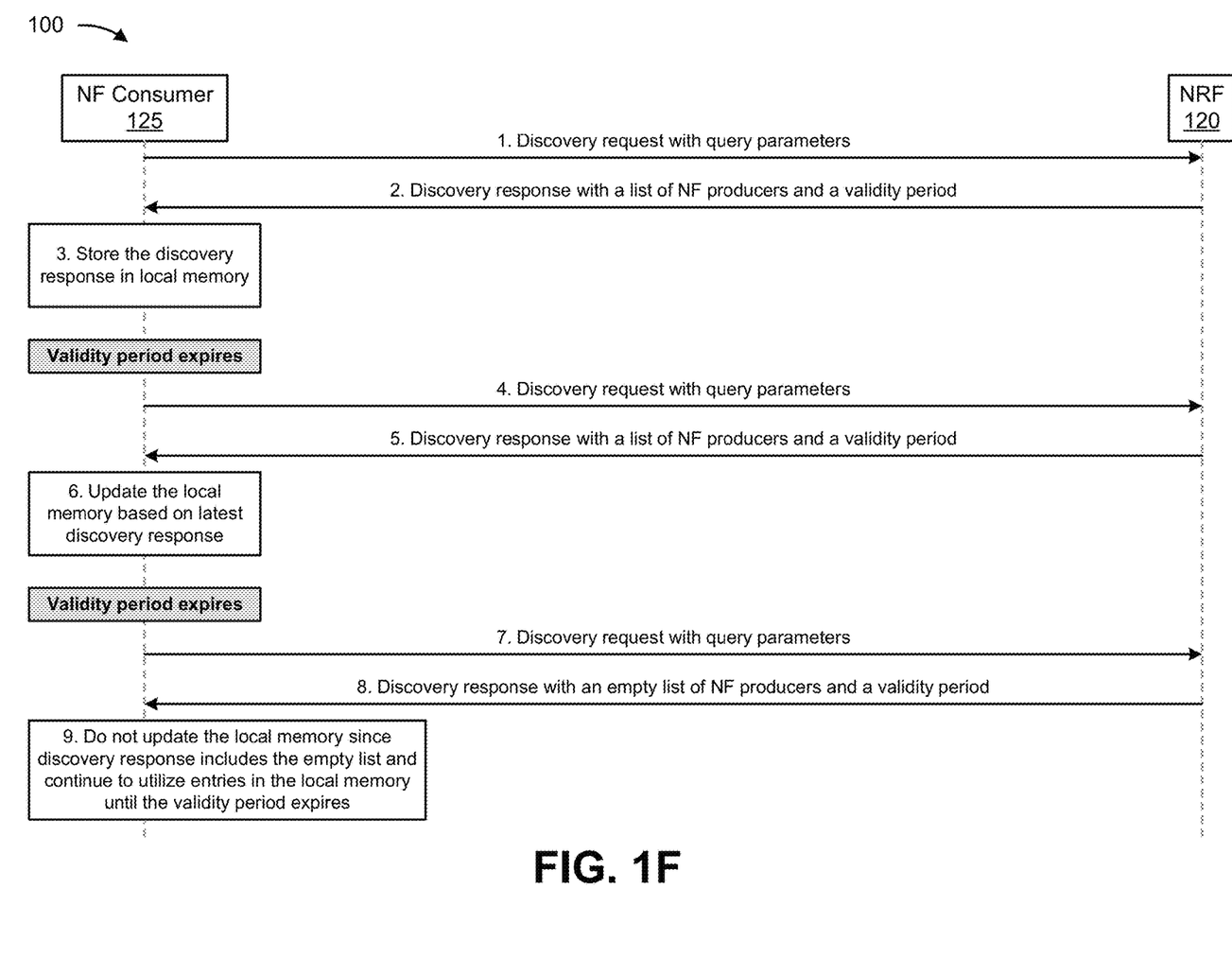

FIG. 1F depicts an example call flow diagram associated with how the NF consumer 125 may handle discovery responses from the NRF 120. As shown at step 1 of FIG. 1F, the NF consumer 125 may provide a discovery request with query parameters (e.g., requesting identification of NF producers 125 providing a service or with an NF type) to the NRF 120. As shown at step 2 of FIG. 1F, the NF consumer 125 may receive, from the NRF 120, a discovery response with a list of NF producers 125 and a validity period. As shown at step 3 of FIG. 1F, since the discovery response does not include an empty set of NF producers 125, the NF consumer 125 may store the discovery response in a local memory.

When the validity period expires, and as shown at step 4 of FIG. 1F, the NF consumer 125 may provide another discovery request with query parameters (e.g., requesting identification of NF producers 125 providing a service or with an NF type) to the NRF 120. As shown at step 5 of FIG. 1F, the NF consumer 125 may receive, from the NRF 120, another discovery response with a list of NF producers 125 and a validity period. As shown at step 6 of FIG. 1F, since the discovery response does not include an empty set of NF producers 125, the NF consumer 125 may update the local memory based on the other (latest) discovery response.

When the validity period expires, and as shown at step 7 of FIG. 1F, the NF consumer 125 may provide yet another discovery request with query parameters (e.g., requesting identification of NF producers 125 providing a service or with an NF type) to the NRF 120. As shown at step 8 of FIG. 1F, the NF consumer 125 may receive, from the NRF 120, a discovery response with an empty list of NF producers 125 and a validity period. As shown at step 9 of FIG. 1F, since the discovery response includes an empty list of NF producers 125 and a replacement information element set to "No," the NF consumer 125 may not update the local memory based on the discovery response and may continue to utilize entries in the local memory until the validity period expires.

In this way, the NRF 120 may return a non-empty discovery response. For example, the NRF 120 may be enhanced to enable the NRF 120 to return a list of suspended NF producers 125 in a discovery response to a discovery request from an NF consumer 125. In scenarios when the NRF 120 cannot identify any NF producer 125 with an active status, the NRF 120 may return a list of NF producers 125 that are in suspended state, but with a status set to active so that an NF consumer 125 may select a suspended NF producer 125. Alternatively, the NRF 120 may return a list of NF producers 125 that are in a suspended state, but with lower priorities. This may ensure that the NF consumer 125 selects other NF producers 125 with higher priorities. Thus, the NRF 120 may conserve computing resources, networking resources, and/or other resources that would otherwise have been consumed in failing to provide a service to a UE 105 that is available from an NF 125, handling subscriber complaints due to the failure to receive the service, discovering that the service is available from the NF 125, providing the service to the UE 105 via the NF 125 after discovering that the service is available, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
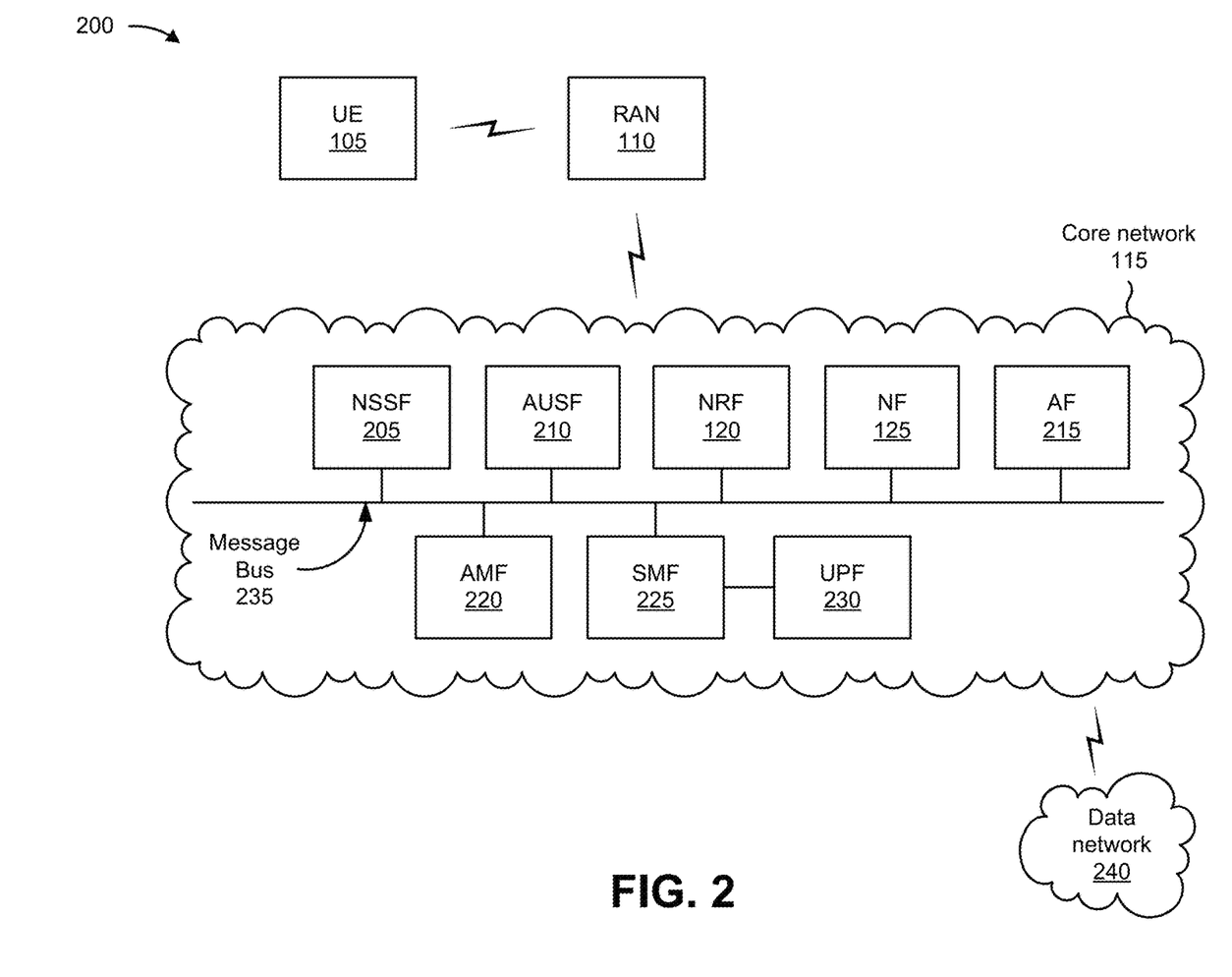
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 240. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, the NRF 120, the NF 125, a network slice selection function (NSSF) 205, an authentication server function (AUSF) 210, an application function (AF) 215, an access and mobility management function (AMF) 220, a session management function (SMF) 225, and/or a user plane function (UPF) 230. These functional elements may be communicatively connected via a message bus 235. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NRF 120 includes one or more devices that maintain profiles of NFs 125 and services supported by available NFs 125 and that enables the NFs 125 to subscribe to, and receive notifications about, other NFs 125 registered with the NRF 120. The NRF 120 also supports a service discovery function by receiving NF discovery requests from NFs 125, and providing information about available NFs 125 satisfying certain criteria (e.g., supporting a particular service).

The NF 125 includes one or more of the NSSF 205, the AUSF 210, the AF 215, the AMF 220, the SMF 225, the UPF 230, a structured data storage network function (SDSF), an unstructured data storage network function (UDSF), a network exposure function (NEF), a policy control function (PCF), a unified data management (UDM) device, and/or the like.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the UE 105 in the wireless telecommunications system.

The AF 215 includes one or more devices that support application influence on traffic routing, access to other functions, and/or policy control, among other examples.

The AMF 220 includes one or more devices that act as a termination point for non-access stratum (NAS) signaling and/or mobility management, among other examples.

The SMF 225 includes one or more devices that support the establishment, modification, and release of communication sessions in the wireless telecommunications system. For example, the SMF 225 may configure traffic steering policies at the UPF 230 and/or may enforce user equipment Internet protocol (IP) address allocation and policies, among other examples.

The UPF 230 includes one or more devices that serve as an anchor point for intraRAT and/or interRAT mobility. The UPF 230 may apply rules to packets, such as rules pertaining to packet routing, traffic reporting, and/or handling user plane QoS, among other examples.

The message bus 235 represents a communication structure for communication among the functional elements. In other words, the message bus 235 may permit communication between two or more functional elements.

The data network 240 includes one or more wired and/or wireless data networks. For example, the data network 240 may include an IP Multimedia Subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
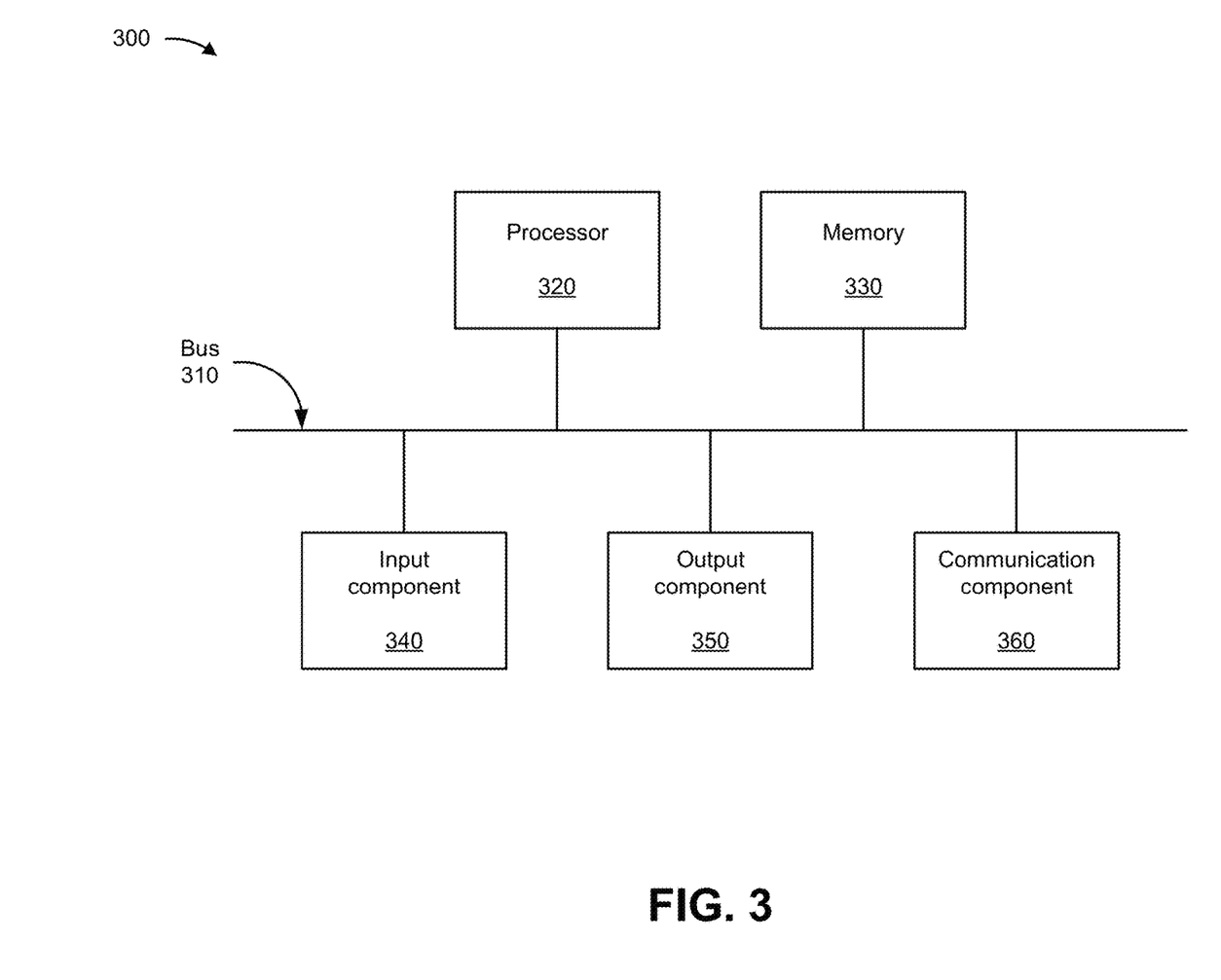
FIG. 3 is a diagram of example components of one or more devices of FIG. 2.

FIG. 3 is a diagram of example components of a device 300, which may correspond to the UE 105, the RAN 110, the NRF 120, the NF 125, the NSSF 205, the AUSF 210, the AF 215, the AMF 220, the SMF 225, and/or the UPF 230. In some implementations, the UE 105, the RAN 110, the NRF 120, the NF 125, the NSSF 205, the AUSF 210, the AF 215, the AMF 220, the SMF 225, and/or the UPF 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
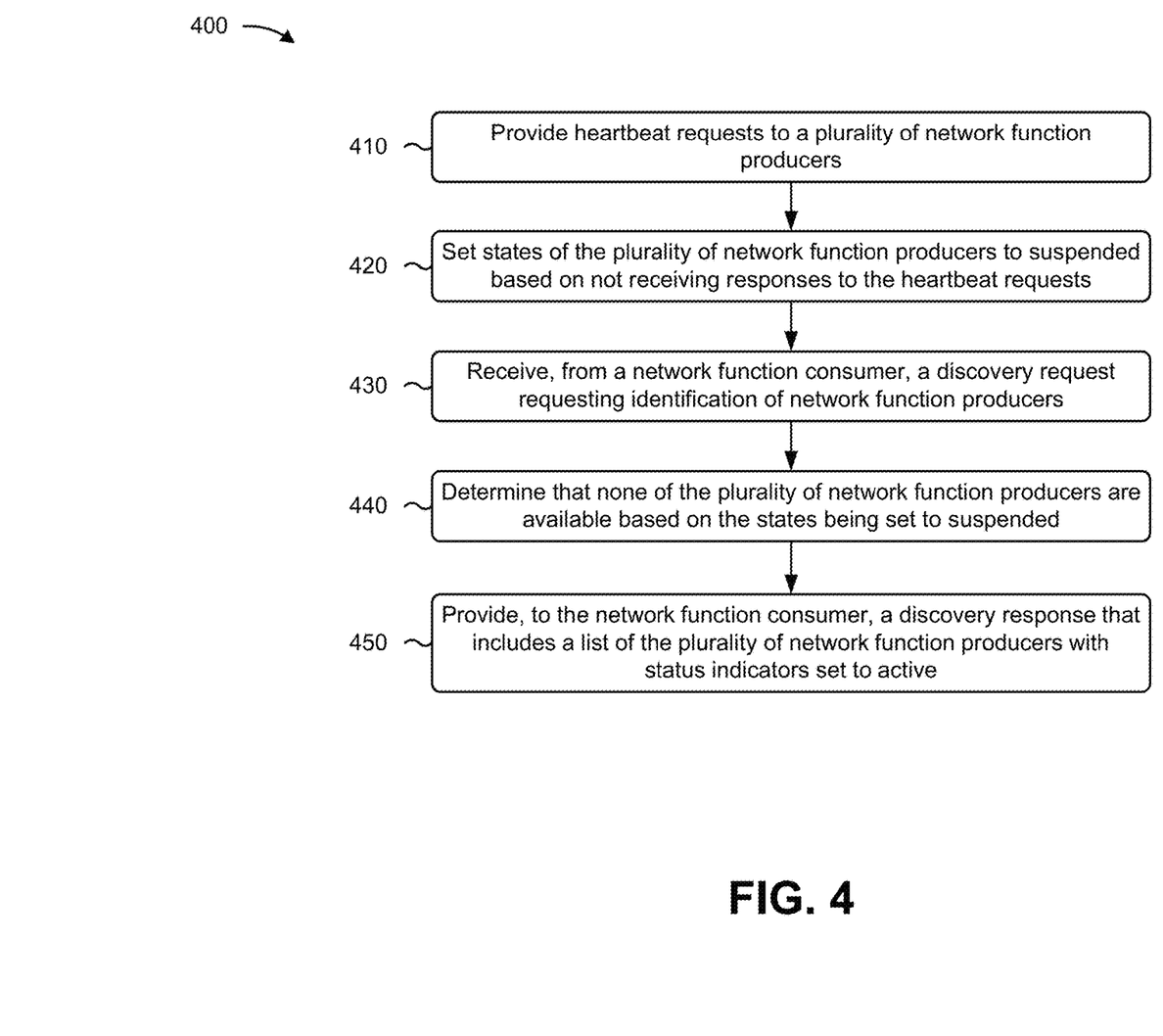
FIG. 4 is a flowchart of an example process for enabling an NRF to return a non-empty discovery response.

FIG. 4 is a flowchart of an example process 400 for enabling an NRF to return a non-empty discovery response. In some implementations, one or more process blocks of FIG. 4 may be performed by a network device (e.g., the NRF 120). In some implementations, one or more process blocks of FIG. 4 may be performed by another device or a group of devices separate from or including the network device, such as an NF (e.g., the NF 125). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing heartbeat requests to a plurality of network function producers (block 410). For example, the network repository function may provide heartbeat requests to a plurality of network function producers, as described above. In some implementations, the plurality of network function producers includes one or more of a network slice selection function, an authentication server function, an application function, an access and mobility management function, a user plane function, a structured data storage network function, an unstructured data storage network function, a network exposure function, a policy control function, or a unified data management device. In some implementations, the plurality of network function producers are registered with the network repository function.

As further shown in FIG. 4, process 400 may include setting states of the plurality of network function producers to suspended based on not receiving responses to the heartbeat requests (block 420). For example, the network repository function may set states of the plurality of network function producers to suspended based on not receiving responses to the heartbeat requests after a predetermined time, as described above. In some implementations, the responses to the heartbeat requests are not received after the predetermined time due to the plurality of network function producers being disabled or due to transport issues associated with the plurality of network function producers.

As further shown in FIG. 4, process 400 may include receiving, from a network function consumer, a discovery request requesting identification of network function producers (block 430). For example, the network repository function may receive, from a network function consumer, a discovery request requesting identification of network function producers providing a service or with a network function type, as described above. In some implementations, the network function consumer is configured to select one or more of the plurality of network function producers to provide the service or the network function type. In some implementations, the network function consumer is registered with the network repository function.

As further shown in FIG. 4, process 400 may include determining that none of the plurality of network function producers are available based on the states being set to suspended (block 440). For example, the network repository function may determine, based on the discovery request, that none of the plurality of network function producers are available based on the states of the plurality of network function producers being set to suspended, as described above.

As further shown in FIG. 4, process 400 may include providing, to the network function consumer, a discovery response that includes a list of the plurality of network function producers with status indicators set to active (block 450). For example, the network repository function may provide, to the network function consumer, a discovery response that includes a list of the plurality of network function producers with status indicators set to active, as described above.

In some implementations, process 400 includes setting, based on the discovery request and based on not receiving responses to the heartbeat requests after the predetermined time, priorities and validity times, for the plurality of network function producers, that are less than a priority and a validity time for an active network function producer; and providing, to the network function consumer, another discovery response that includes the list of the plurality of network function producers with the priorities and the validity times. In some implementations, process 400 includes receiving, from the network function consumer and after expiration of the validity times, another discovery request requesting identification of network function producers providing another service or with another network function type.

In some implementations, process 400 includes receiving heartbeat responses, to the heartbeat requests, from a set of the plurality of network function producers; receiving, from the network function consumer, another discovery request requesting identification of network function producers providing the service or with the network function type; determining, based on the other discovery request, that the set of the plurality of network function producers are available based on receiving the heartbeat responses from the set of the plurality of network function producers; and providing, to the network function consumer, another discovery response that causes the network function consumer to replace entries in a local memory with entries identifying the set of the plurality of network function producers.

In some implementations, process 400 includes providing, to the network function consumer, another discovery response that causes the network function consumer to not replace entries in a local memory. In some implementations, the other discovery response includes a validity time for the other discovery response and process 400 includes receiving, from the network function consumer and after expiration of the validity time, another discovery request requesting identification of network function producers providing another service or with another network function type.

In some implementations, process 400 includes identifying one of the plurality of network function producers with a particular network function type; and providing, to the network function consumer, another discovery response that includes the list of the plurality of network function producers and a status indicator for the one of plurality of network function producers being set to suspended.

In some implementations, the discovery response includes a validity time for the discovery response and process 400 includes receiving, from the network function consumer and after expiration of the validity time, another discovery request requesting identification of network function producers providing another service or with another network function type.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   providing, by a network repository function, heartbeat requests to a plurality of network function producers;
   setting, by the network repository function, states of the plurality of network function producers to suspended based on not receiving responses to the heartbeat requests after a predetermined time;
   receiving, by the network repository function and from a network function consumer, a discovery request requesting identification of network function producers providing a service or with a network function type;
   determining, by the network repository function and based on the discovery request, that none of the plurality of network function producers are available based on the states of the plurality of network function producers being set to suspended; and
   providing, by the network repository function and to the network function consumer, a discovery response that includes a list of the plurality of network function producers with status indicators set to active.

2. The method of claim 1, further comprising:
   setting, based on the discovery request and based on not receiving responses to the heartbeat requests after the predetermined time, priorities and validity times, for the plurality of network function producers, that are less than a priority and a validity time for an active network function producer; and
   providing, to the network function consumer, another discovery response that includes the list of the plurality of network function producers with the priorities and the validity times.

3. The method of claim 2, further comprising:
   receiving, from the network function consumer and after expiration of the validity times, another discovery request requesting identification of network function producers providing another service or with another network function type.

4. The method of claim 1, further comprising:
   receiving heartbeat responses, to the heartbeat requests, from a set of the plurality of network function producers;
   receiving, from the network function consumer, another discovery request requesting identification of network function producers providing the service or with the network function type;
   determining, based on the other discovery request, that the set of the plurality of network function producers are available based on receiving the heartbeat responses from the set of the plurality of network function producers; and
   providing, to the network function consumer, another discovery response that causes the network function consumer to replace entries in a local memory with entries identifying the set of the plurality of network function producers.

5. The method of claim 1, further comprising:
   providing, to the network function consumer, another discovery response that causes the network function consumer to not replace entries in a local memory.

6. The method of claim 5, wherein the other discovery response includes a validity time for the other discovery response, and the method further comprises:
   receiving, from the network function consumer and after expiration of the validity time, another discovery request requesting identification of network function producers providing another service or with another network function type.

7. The method of claim 1, further comprising:
   identifying one of the plurality of network function producers with a particular network function type; and
   providing, to the network function consumer, another discovery response that includes the list of the plurality of network function producers and a status indicator for the one of plurality of network function producers being set to suspended.

8. A network repository function, comprising:
   one or more processors configured to:
      provide heartbeat requests to a plurality of network function producers;

set states of the plurality of network function producers to suspended based on not receiving responses to the heartbeat requests after a predetermined time;

receive, from a network function consumer, a discovery request requesting identification of network function producers providing a service or with a network function type;

determine, based on the discovery request, that none of the plurality of network function producers are available based on the states of the plurality of network function producers being set to suspended; and provide, to the network function consumer, a discovery response that includes a list of the plurality of network function producers with status indicators set to active, wherein the discovery response causes the network function consumer to not replace entries in a local memory.

9. The network repository function of claim 8, wherein the discovery response includes a validity time for the discovery response and the one or more processors are further configured to:

receive, from the network function consumer and after expiration of the validity time, another discovery request requesting identification of network function producers providing another service or with another network function type.

10. The network repository function of claim 8, wherein the plurality of network function producers includes one or more of:

a network slice selection function,
an authentication server function,
an application function,
an access and mobility management function,
a user plane function,
a structured data storage network function,
an unstructured data storage network function,
a network exposure function,
a policy control function, or
a unified data management device.

11. The network repository function of claim 8, wherein the network function consumer is configured to select one or more of the plurality of network function producers to provide the service or the network function type.

12. The network repository function of claim 8, wherein the responses to the heartbeat requests are not received after the predetermined time due to the plurality of network function producers being disabled or due to transport issues associated with the plurality of network function producers.

13. The network repository function of claim 8, wherein the plurality of network function producers are registered with the network repository function.

14. The network repository function of claim 8, wherein the network function consumer is registered with the network repository function.

15. A non-transitory computer-readable medium storing a set of instructions, the set of instructions comprising:

one or more instructions that, when executed by one or more processors of a network repository function, cause the network repository function to:

register a network function consumer and a plurality of network function producers;

provide heartbeat requests to the plurality of network function producers;

set states of the plurality of network function producers to suspended based on not receiving responses to the heartbeat requests after a predetermined time;

receive, from the network function consumer, a discovery request requesting identification of network function producers providing a service or with a network function type;

determine, based on the discovery request, that none of the plurality of network function producers are available based on the states of the plurality of network function producers being set to suspended; and provide, to the network function consumer, a discovery response that includes a list of the plurality of network function producers with status indicators set to active.

16. The non-transitory computer-readable medium of claim 15, wherein the one or more instructions further cause the network repository function to:

set, based on the discovery request and based on not receiving responses to the heartbeat requests after the predetermined time, priorities and validity times, for the plurality of network function producers, that are less than a priority and a validity time for an active network function producer; and provide, to the network function consumer, another discovery response that includes the list of the plurality of network function producers with the priorities and the validity times.

17. The non-transitory computer-readable medium of claim 15, wherein the one or more instructions further cause the network repository function to:

receive heartbeat responses, to the heartbeat requests, from a set of the plurality of network function producers;

receive, from the network function consumer, another discovery request requesting identification of network function producers providing the service or with the network function type;

determine, based on the other discovery request, that the set of the plurality of network function producers are available based on receiving the heartbeat responses from the set of the plurality of network function producers; and provide, to the network function consumer, another discovery response that causes the network function consumer to replace entries in a local memory with entries identifying the set of the plurality of network function producers.

18. The non-transitory computer-readable medium of claim 15, wherein the one or more instructions further cause the network repository function to:

provide, to the network function consumer, another discovery response that causes the network function consumer to not replace entries in a local memory.

19. The non-transitory computer-readable medium of claim 15, wherein the one or more instructions further cause the network repository function to:

identify one of the plurality of network function producers with a particular network function type; and provide, to the network function consumer, another discovery response that includes the list of the plurality of network function producers and a status indicator for the one of plurality of network function producers being set to suspended.

20. The non-transitory computer-readable medium of claim 15, wherein the network function consumer is configured to select one or more of the plurality of network function producers to provide the service or the network function type.

* * * * *